United States Patent [19]

McClanahan et al.

[11] Patent Number: 5,628,578
[45] Date of Patent: May 13, 1997

[54] ALTERNATE PINCH BOLT YOKE CONSTRUCTION

[75] Inventors: Virginia L. McClanahan, Monclova; Michael R. Ott, Toledo, both of Ohio

[73] Assignee: Dana Corporation, Toledo, Ohio

[21] Appl. No.: 508,465

[22] Filed: Jul. 28, 1995

[51] Int. Cl.$^6$ .............................................. F16B 7/04
[52] U.S. Cl. .................... 403/290; 403/13; 403/57; 403/359; 403/373
[58] Field of Search .................... 403/157, 13, 14, 403/58, 57, 79, 359, 378, 235, 74, 373, 217, 218, 219, 290; 464/134, 135; 180/400; 74/492

[56] References Cited

U.S. PATENT DOCUMENTS

| | | | |
|---|---|---|---|
| 3,272,540 | 9/1966 | Glanzer | 403/218 |
| 3,923,409 | 12/1975 | Stoner | 403/373 X |
| 4,289,417 | 9/1981 | Mandell | 403/218 |
| 4,334,414 | 6/1982 | Stephan | 404/134 |
| 4,628,758 | 12/1986 | Yuzuriha et al. | 403/14 X |
| 4,646,552 | 3/1987 | Kanbe | 72/379 |
| 4,899,611 | 2/1990 | Pinna | 74/492 |
| 5,007,759 | 4/1991 | Scherer | 403/13 |
| 5,018,899 | 5/1991 | Kuribara et al. | 403/57 |
| 5,052,842 | 10/1991 | Janatka | 403/359 X |
| 5,090,833 | 2/1992 | Oertle et al. | 403/373 X |
| 5,094,562 | 3/1992 | Anderson | 403/218 X |
| 5,188,474 | 2/1993 | Ohkubo et al. | 403/57 |
| 5,358,350 | 10/1994 | Oertle | 403/373 X |
| 5,366,316 | 11/1994 | Cymbal | 430/359 X |

FOREIGN PATENT DOCUMENTS

| | | | |
|---|---|---|---|
| 26509 | 10/1898 | United Kingdom | 403/217 |

*Primary Examiner*—Kenneth J. Dorner
*Assistant Examiner*—Harry C. Kim
*Attorney, Agent, or Firm*—MacMillan, Sobanski & Todd

[57] ABSTRACT

An improved construction for a pinch bolt yoke for use as a flexible coupling in a vehicle steering system includes two separate components, a block and a stamping. The block includes front and rear surfaces, upper and lower surfaces, opposing side surfaces, and edges between the surfaces. The block includes a longitudinal axis extending between the front and rear surfaces. The block further includes a cutout to accommodate a transverse bolt. The cutout extends across a portion of the upper surface in a direction generally perpendicular to the longitudinal axis. The block further includes a bore to receive a shaft. The bore extends through the block between the front and rear surfaces in a direction generally parallel to the longitudinal axis. The stamping is adapted to receive the block. The stamping includes a base and a pair of arms extending perpendicularly from the base. The stamping further includes a front surface and a rear end, upper and lower surfaces, and opposing side surfaces. A transverse axis extends between the side surfaces. The stamping further includes a pair of apertures formed through the lower front corner of each arm. The apertures are aligned with one another in a direction parallel to the transverse axis, and they are adapted to receive a transverse bolt. The stamping further includes a pair of holes formed through the rear end of each arm. The holes are preferably aligned with one another in a direction parallel to the transverse axis, and they are adapted to receive a pair of opposed bearings.

24 Claims, 5 Drawing Sheets

5,628,578

ALTERNATE PINCH BOLT YOKE CONSTRUCTION

BACKGROUND OF THE INVENTION

This invention relates in general to flexible couplings for use in the steering systems of vehicles, and in particular to an improved construction for a pinch bolt yoke for use in a vehicle steering system.

A vehicle steering system includes a steering wheel connected to a steering column. The steering column, in turn, is connected to an intermediate steering shaft. The intermediate steering shaft is connected at its other end to a steering gear. The steering gear, in ram, is connected to the front wheels of the vehicle. The vehicle steering system transfers the rotational motion of the steering wheel to the front wheels of the vehicle to cause the vehicle to turn.

The steering column, intermediate steering shaft, and steering gear are not axially aligned with one another. Consequently, flexible couplings are provided between the steering column and the intermediate steering shaft, and between the intermediate steering shaft and the steering gear. The flexible couplings allow proper connection of the steering column, intermediate steering shaft, and steering gear when these structures are rotated.

Pinch bolt yokes have been used as flexible couplings in a vehicle steering system. For example, pinch bolt yokes have been used as flexible couplings between a steering column and an intermediate steering shaft. The steering column includes a shaft portion. A notch for a transverse bolt is formed on the shaft portion. The pinch bolt yoke includes a bore and transverse apertures. When it is desired to connect the steering column to the pinch bolt yoke, the shaft portion of the steering column is inserted into the bore of the pinch bolt yoke. The transverse apertures of the pinch bolt yoke are aligned with the notch formed on the shaft portion. A transverse bolt is inserted through the transverse apertures and notch to complete the connection.

By way of background, steering columns are manufactured in many different sizes and configurations for use in a variety of different vehicles. The shaft portion of the steering column comes in different sizes. It can be cylindrical, rectangular or squared, and its surface can be splined or keyed. The notch for the transverse bolt can be positioned at different locations on the shaft portion. The transverse bolt can also be different sizes.

A conventional pinch bolt yoke is a forged one-piece construction. Unfortunately, such a one-piece construction is suitable for use with only one kind of steering column. Whenever the shaft portion of the steering column is changed, a pinch bolt yoke with a different bore is selected so that the bore is suitable for receiving the shaft portion. Likewise, whenever the positioning or size of the transverse bolt is changed, a pinch bolt yoke with different transverse apertures is selected so that the transverse apertures are suitable for receiving the transverse bolt. Thus conventional pinch bolt yokes are manufactured in many different designs to be suitable for use with the many different steering columns. As a result, conventional pinch bolt yokes have been relatively costly to manufacture. Moreover, the need for different pinch bolt yoke designs in different vehicles has been troublesome and expensive to vehicle manufacturers and mechanics.

Therefore, it would be desirable to provide an improved construction for a pinch bolt yoke which requires fewer designs and is relatively inexpensive to manufacture.

SUMMARY OF THE INVENTION

This invention relates to an improved construction for a pinch bolt yoke for use as a flexible coupling in a vehicle steering system. The pinch bolt yoke comprises two separate components, a block and a stamping. The block includes front and rear surfaces, upper and lower surfaces, opposing side surfaces, and edges between the surfaces. The block includes a longitudinal axis extending between the front and rear surfaces. The block further includes a cutout to accommodate a transverse bolt. The cutout extends across a portion of the upper surface in a direction generally perpendicular to the longitudinal axis. Preferably the cutout extends along the edge between the front and upper surfaces. The cutout is preferably generally arcuate in shape when viewed from the side. The block further includes a bore to receive a shaft. The bore extends through the block between the front and rear surfaces in a direction generally parallel to the longitudinal axis. Preferably the bore is formed to prevent relative rotational movement between the block and the shaft.

The stamping is adapted to receive the block. The stamping includes a base and a pair of arms extending perpendicularly from the base. The stamping further includes a front surface and a rear end, upper and lower surfaces, and opposing side surfaces. A transverse axis extends between the side surfaces. The stamping further includes a pair of apertures formed through the lower front corner of each arm. The apertures are aligned with one another in a direction parallel to the transverse axis, and they are adapted to receive a transverse bolt. The stamping further includes a pair of holes formed through the rear end of each arm. The holes are preferably aligned with one another in a direction parallel to the transverse axis, and they are adapted to receive a pair of opposed bearings.

Preferably the block and stamping include cooperating retention means to prevent relative movement of the block in the stamping prior to assembly in the steering system. For example, the retention means can include recesses in the block which engage corresponding protrusions on the stamping.

The two-piece construction of the present pinch bolt yoke provides many advantages over the conventional forged one-piece construction. The number of designs to accommodate different shafts is greatly reduced, because of the flexibility of changing either the block or the stamping without requiring an entirely different pinch bolt yoke. The present construction also eliminates forging, drilling and broaching of the bore, and drilling of the transverse apertures. As a result of these savings, the present pinch bolt yoke is much less expensive to manufacture than conventional yokes.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
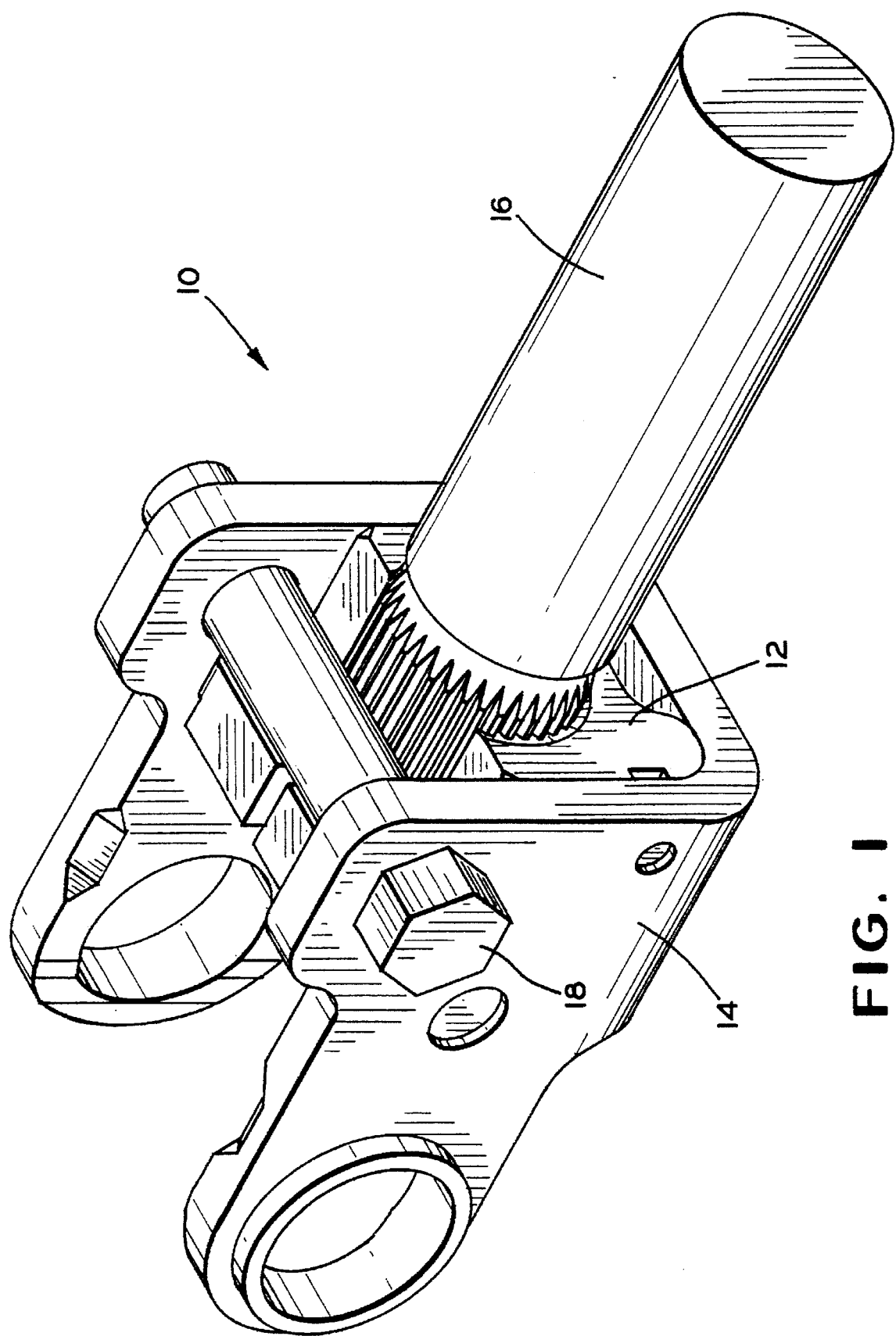
FIG. 1 is a perspective view of the shaft portion of a steering column connected to a pinch bolt yoke in accordance with this invention.

Referring now to the drawings, there is illustrated in FIG. 1 a perspective view of the shaft portion of a steering column connected to a pinch bolt yoke in accordance with this invention. The pinch bolt yoke is indicated generally at 10. The pinch bolt yoke 10 includes a block 12 and a stamping 14. The block 12 is is disposed inside the stamping 14. The shaft portion 16 of a steering column is connected to the pinch bolt yoke 10, in a manner which will be described in more detail below. A transverse bolt 18 connects the shaft portion 16 to the pinch bolt yoke 10.

Figure 2:
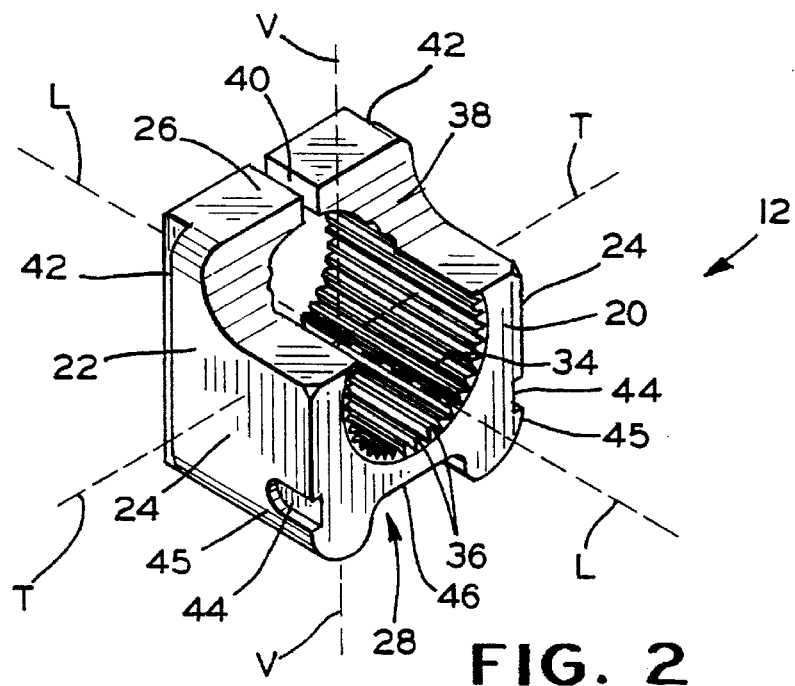
FIG. 2 is a perspective view of a block for a pinch bolt yoke in accordance with this invention.

Referring now to FIG. 2, the block 12 for the pinch bolt yoke 10 is shown in more detail. The block 12 has the general shape of a rectangular solid, and preferably it is generally cubical in shape. The block 12 includes a front surface 20 and a rear surface 22. A longitudinal axis L extends between the front surface 20 and the rear surface 22. The block 12 further includes two side surfaces 24. A transverse axis T extends between the two side surfaces 24. The block 12 further includes an upper surface 26 and a lower surface 28. A vertical axis V extends between the upper surface 26 and the lower surface 28.

A bore 34 extends through the block 12 from the front surface 20 to the rear surface 22. The bore 34 extends in a direction generally parallel to the longitudinal axis L of the block 12. Preferably the bore 34 is generally centered in the block 12. The bore 34 is adapted to receive the shaft portion 16 of the steering column.

Preferably the bore 34 is formed to prevent relative rotational movement between the block 12 and the shaft portion 16. For example, the preferred block 12 shown in FIG. 2 includes a cylindrical bore 34 with internal serrated splines 36 which cooperate with splines on the end of the shaft portion 16 to prevent rotation.

The block 12 also includes a cutout 38 which extends across a portion of the upper surface 26 in a direction generally perpendicular to the longitudinal axis L. Preferably, as shown in FIG. 2, the cutout 38 extends along the edge between the front surface 20 and the upper surface 26, i.e., the intersection between the front surface 20 and the upper surface 26. The cutout 38 extends parallel with the transverse axis T of the block 12, and perpendicular to the longitudinal axis L. The cutout 38 intersects perpendicularly with a portion of the bore 34. When viewed from the side, the cutout 38 is generally arcuate in shape. As will be discussed below, the cutout 38 is sized to accommodate (make space for) a transverse bolt 18 which connects the shaft portion 16 of the steering column to the pinch bolt yoke 10.

The block 12 also preferably includes a slot 40. The slot 40 extends through the upper surface 26 to the bore 34. The slot 40 extends across the upper surface in a direction generally parallel to the longitudinal axis L of the block 12. This slot 40 is provided to allow the block 12 to partially collapse when torque is applied to the transverse bolt 18, providing a firm assembled fit between the block 12 and the shaft portion 16 of the steering column.

Preferably the block 12 includes retention means for preventing relative movement of the block 12 within the stamping 14 prior to assembly of the transverse bolt 18. In the preferred embodiment shown in FIG. 2, the retention means includes a pair of vertical recesses 42. The vertical recesses 42 extend along the edges between the side surfaces 24 and the rear surface 22 of the block 12, i.e., the intersections between the side surfaces 24 and the rear surface 22. The vertical recesses 42 extend parallel to the vertical axis V of the block 12. Preferably they extend the entire vertical height between the upper surface 26 and the lower surface 28 of the block 12.

Preferably the retention means further includes a pair of horizontal recesses 44. Each side surface 24 of the block 12 includes a lower front corner 45. Each horizontal recess 44 is formed in the lower front corner 45 of the side surface 24. Further, each horizontal recess 44 extends to the front surface 20 of the block 12. The horizontal recesses 44 are aligned with one another in a direction parallel to the transverse axis T of the block 12.

Preferably the block 12 includes a shallow, wide groove 46 formed in its lower surface 28. The groove 46 extends across the lower surface 28 parallel to the longitudinal axis L. The groove 46 reduces the stiffness of the lower surface 28 of the block 12. This allows the clamping load of the transverse bolt 18 to be transferred more efficiently through the block 12 to the intermediate steering shaft. The groove 46 also minimizes the weight of the block 12 by removing unnecessary material.

The block 12 is preferably formed from a metallic material such as steel, iron or aluminum. More preferably it is formed from a powdered metal, and most preferably from powdered steel. However, it can also be formed from other materials such as plastics.

Figure 3:
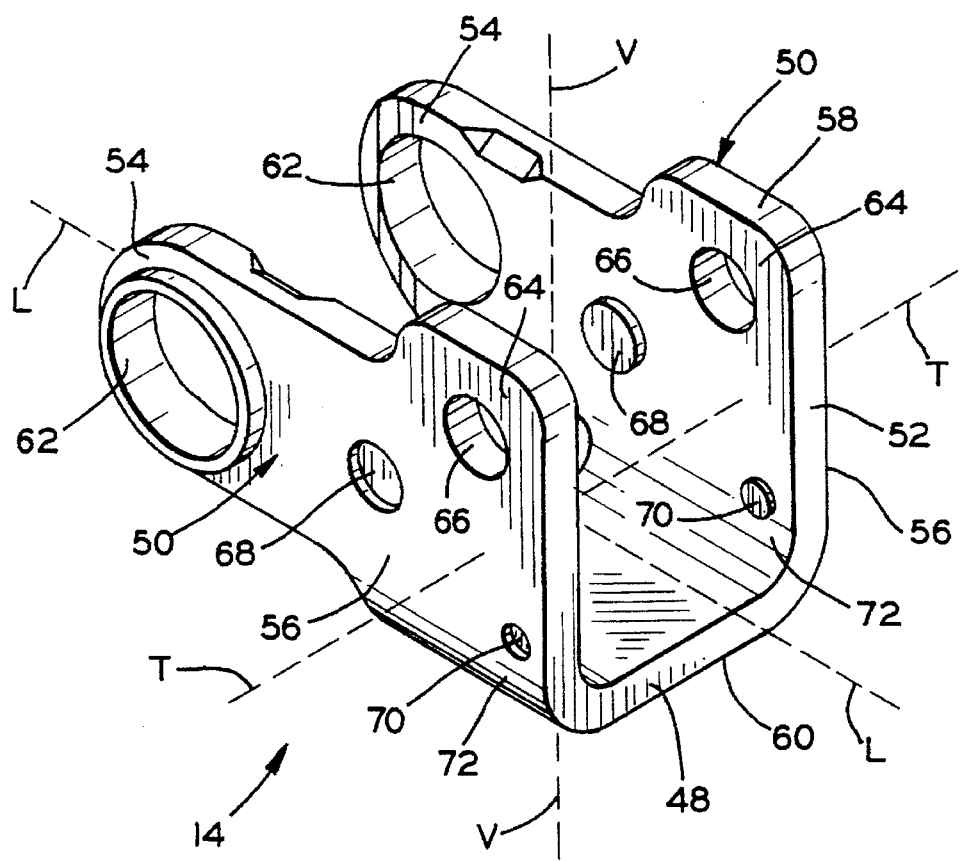
FIG. 3 is a perspective view of a stamping for a pinch bolt yoke in accordance with this invention.

Referring now to FIG. 3, the stamping 14 for the pinch bolt yoke 10 is shown in more detail. The stamping 14 is adapted to receive the block 12. The stamping 14 includes a base 48 and a pair of arms 50. The arms 50 extend parallel to one another, and parallel to a longitudinal axis L of the stamping. The arms 50 are formed integrally with the base 48, and they extend perpendicularly therefrom.

The stamping 14 includes a front surface 52 and a rear end 54. The longitudinal axis L extends between the front surface 52 and the rear end 54. The stamping 14 further includes two side surfaces 56 extending along the arms 50. A transverse axis T extends between the side surfaces 56. The stamping 14 further includes an upper surface 58, and a lower surface 60 extending along the base 48. A vertical axis V extends between the upper surface 58 and the lower surface 60. The stamping 14 has the general shape of a squared U when viewed from the front.

The rear end 54 of each arm 50 is rounded. A hole 62 is formed through the rear end 54 of each arm 50. The holes 62 are aligned with one another in a direction parallel to the transverse axis T of the stamping 14. These holes 62 are bearing holes which are adapted to receive a pair of opposed bearings of a journal cross connecting the pinch bolt yoke 10 to an intermediate steering shaft. The holes 62 can be extruded outwardly as shown in FIG. 3 for extra bearing support if necessary.

Each arm 50 includes a corner 64 between the from surface 52 and the upper surface 58. An aperture 66 is formed through the corner 64 of each arm 50. The apertures 66 are aligned with one another in a direction parallel to the transverse axis T of the stamping 14. These apertures 66 are sized to receive the transverse bolt 18.

Preferably the stamping 14 includes retention means for preventing relative movement of the block 12 within the stamping 14 prior to assembly of the transverse bolt 18. In the preferred embodiment shown in FIG. 3, the retention means includes a first pair of inwardly extending protrusions 68. A protrusion 68 extends inwardly from each arm 50. Each protrusion 68 is preferably formed integrally with the arm 50. The protrusions 68 shown in FIG. 3 are preferably formed by inward pressure against the side surface 56 of each arm 50. As a result, each protrusion 68 includes an inward recess in the side surface 56 opposite where it protrudes inwardly. The protrusions 68 are preferably aligned with one another in a direction parallel to the transverse axis T of the stamping 14. Each protrusion 68 is positioned generally in the middle of the arm 50. These protrusions 68 are positioned to cooperate with the vertical recesses 42 of the block, as will be explained below.

The retention means further includes a second pair of inwardly extending protrusions 70. Each arm 50 includes a lower front corner 72. A protrusion 70 extends inwardly from the corner 72 of each arm 50. Each protrusion 70 is formed integrally with the arm 50. The protrusions 70 shown in FIG. 3 are preferably formed by inward pressure against the side surface 56 of each arm 50. As a result, each protrusion 70 includes an inward recess in the side surface 56 opposite where it protrudes inwardly. The protrusions 70 are aligned with one another in a direction parallel to the transverse axis T of the stamping 14. These protrusions 70 are positioned to cooperate with the horizontal recesses 44 of the block, as will be explained below. Preferably the protrusions 70 are not part of the stamping as initially formed, but instead are formed on the stamping by inwardly pressing the arms of the stamping against the sides of the block, after the block has been inserted within the stamping.

The stamping 14 is preferably formed from a metallic material such as steel, iron or aluminum. More preferably it is formed from a stamped metal, and most preferably from stamped steel. However, the stamping can also be formed from other materials such as plastics.

Figure 4:
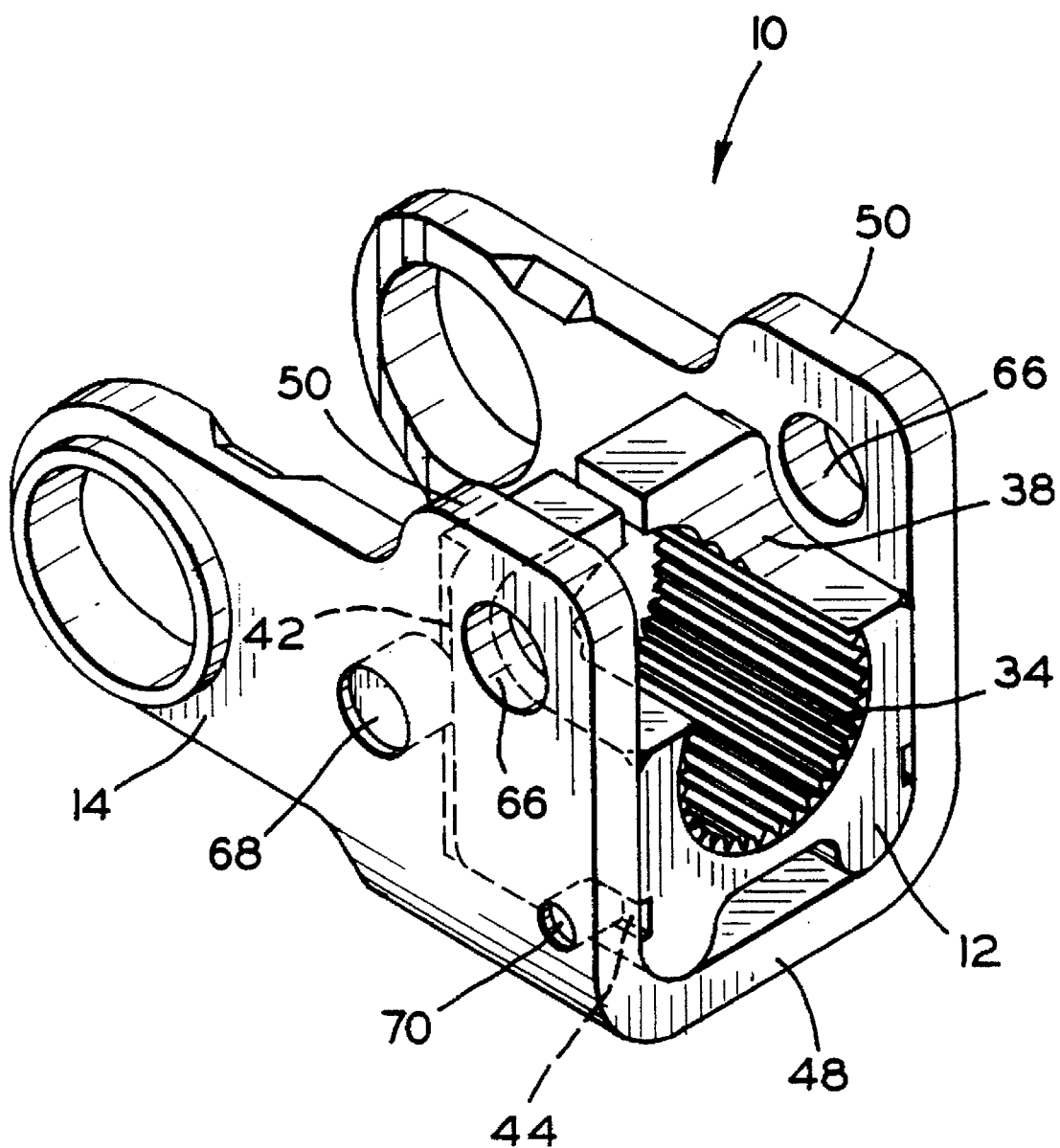
FIG. 4 is a perspective view of the block fitted inside the stamping.
Figure 5:
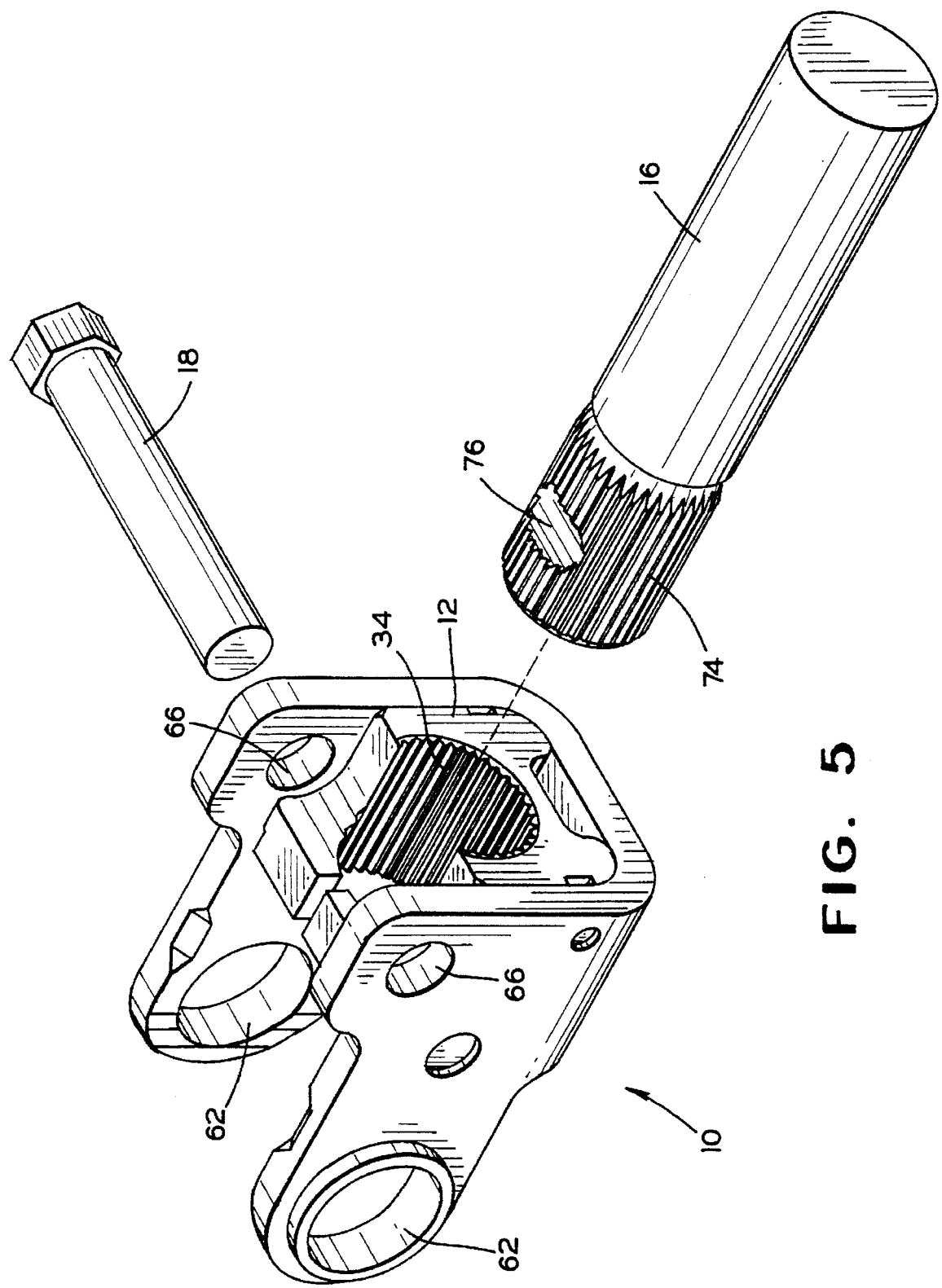
FIG. 5 is a perspective view of the pinch bolt yoke, shaft portion of the steering column, and transverse bolt just prior to assembly.

Referring now to FIGS. 4 and 5, the pinch bolt yoke 10 is assembled in the steering system of a vehicle in the following manner. An appropriate block 12 is chosen so that its bore 34 matches the shaft portion 16 of the steering column in shape, size and configuration. An appropriate stamping 14 is chosen so that its apertures 66 match the size and location of the transverse bolt 18. As shown in FIG. 4, the block 12 is inserted between the arms 50 and base 48 of the stamping 14. The first pair of inwardly extending protrusions 68 of the stamping 14 engage the vertical recesses 42 of the block 12 to provide a positive stop to prevent rearward movement of the block. This assures that the positioning between the block 12 and stamping 14 is maintained before the transverse bolt 18 is assembled. The cutout 38 of the block 12 is disposed adjacent to and between the apertures 66 of the stamping 14.

Once the block 12 is positioned inside the stamping 14, the arms 50 of the stamping 14 are pressed inwardly to form the second pair of protrusions 70. The protrusions 70 engage the horizontal recesses 44 of the block 12 to provide a permanent connection between the block 12 and stamping 14. This allows the end user to easily assemble the pinch bolt yoke 10 to the steering column, eliminating relative movement between the block 12 and stamping 14 prior to final assembly of the transverse bolt 18.

As shown in FIG. 5, the shaft portion 16 of the steering column includes a shaft end 74 which is splined and matches the bore 34 of the block 12. The shaft portion 16 also includes a notch 76 adapted to receive the transverse bolt 18. The shaft end 74 is inserted into the bore 34. The notch 76 is aligned with the apertures 66. The transverse bolt 18 is inserted through the apertures 66 and the notch 76 to connect the shaft portion 16 to the pinch bolt yoke 10, while maintaining a clearance between the front of the pinch bolt yoke 10 and the body of the shaft portion 16. The transverse bolt 18 engages the apertures 66, the notch 76 and the cutout 38 of the block. The transverse bolt 18 thus provides a positive stop for the block 12 in the forward direction and the shaft portion 16 in both directions. A pair of opposed bearings of a journal cross (not shown) are inserted through the holes 62 of the stamping 14 to complete the steering system assembly.

Figure 6:
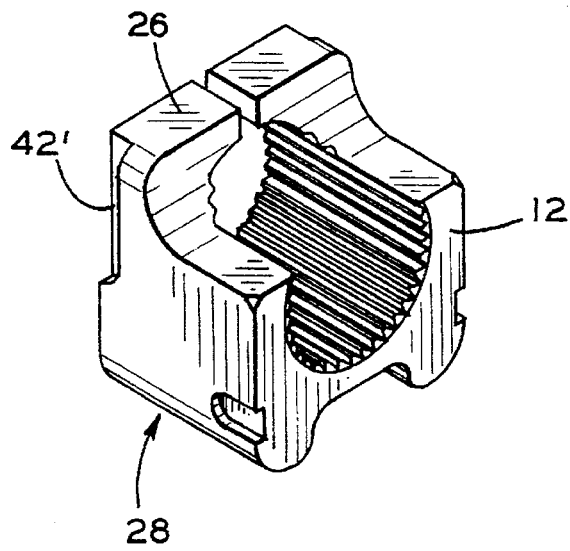
FIG. 6 is a perspective view of a second embodiment of a block in accordance with this invention.

FIG. 6 is a perspective view of a second embodiment of a block 12 in accordance with this invention. Comparing FIG. 6 with FIG. 2, it can be seen that this second embodiment differs from the first embodiment described above in the shape of the first retention means. The first embodiment (shown in FIG. 2) includes a vertical recess 42 extending all the way between the upper surface 26 and lower surface 28 of the block 12. In contrast, the second embodiment shown in FIG. 6 includes a vertical recess 42' which extends only about one-half of the way down from the upper surface 26.

Figure 7:
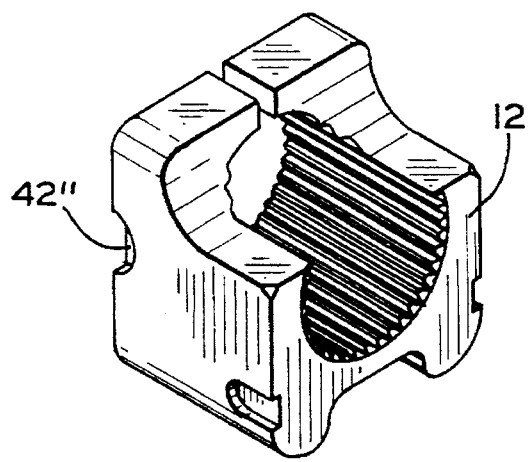
FIG. 7 is a perspective view of a third embodiment of a block in accordance with this invention.

FIG. 7 is a perspective view of a third embodiment of a block 12 in accordance with this invention. Comparing FIG. 7 with FIG. 2, it can be seen that this third embodiment again differs from the first embodiment in the shape of the first retention means. Whereas the first embodiment includes a vertical recess 42, the third embodiment shown in FIG. 7 includes a semicircular recess 42".

Figure 8:
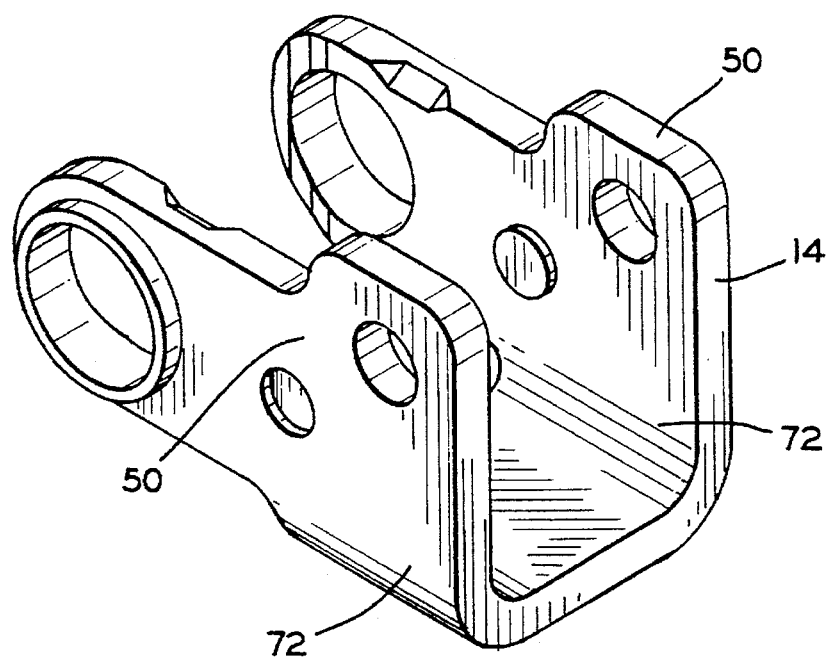
FIG. 8 is a perspective view of a second embodiment of a stamping in accordance with this invention.

FIG. 8 is a perspective view of a second embodiment of a stamping 14 in accordance with this invention. Comparing FIG. 8 with FIG. 3, it can be seen that this second embodiment differs from the first embodiment described above in that the lower front corner 72 of each arm 50 does not include the second pair of protrusions 70 as retention means.

The pinch bolt yoke has been described in relation to a connection between a steering column and an intermediate steering shaft. However, it is understood that the pinch bolt yoke can also be used as a connection between an intermediate steering shaft and a steering gear, or in any other application where a similar flexible connection is required.

The retention means for the pinch bolt yoke have been described in relation to recesses formed in the block and cooperating protrusions formed on the stamping. However, many other different kinds of retention means could also be used. For example, the retention means could include protrusions formed on the block and cooperating recesses formed in the stamping. The protrusions and recesses can have different shapes and sizes and can be positioned at different locations on the block and stamping. The retention means could be any structures which serve to prevent relative movement of the block within the stamping, particularly where one structure is formed in the block and a cooperating structure is formed in the stamping. The retentions means can be ribs, splines, keys, or other cooperating structures.

Similarly, the block and stamping can have shapes and sizes different from the embodiments specifically illustrated above.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A block for a pinch bolt yoke comprising:
a generally rectangular body including front and rear surfaces, upper and lower surfaces, and first and second side surfaces, said body having a splined bore formed therethrough which extends from said front surface to said rear surface along an axis, said body further having a cutout formed in said upper surface which extends generally perpendicular to said axis and which intersects said bore, said cutout extending from said first side surface to said second side surface.

2. The block for a pinch bolt yoke defined in claim 1 wherein said body further has a slot formed in said upper surface extending from said cutout to said rear surface.

3. The block for a pinch bolt yoke defined in claim 1 further including a recess formed in one of said surfaces.

4. The block for a pinch bolt yoke defined in claim 1 further including a groove formed in said lower surface extending from said front surface to said rear surface.

5. A pinch bolt yoke comprising:
a generally rectangular body including front and rear surfaces, upper and lower surfaces, and first and second side surfaces, said body having a bore formed therethrough which extends from said front surface to said rear surface along an axis, said body further having a cutout formed in said upper surface which extends generally perpendicular to said axis and which intersects said bore, said cutout extending from said first side surface to said second side surface; and
a stamping including a pair of arms having respective apertures formed therethrough, portions of said stamping extending about said first and second side surfaces of said body.

6. The pinch bolt yoke defined in claim 5 further including means cooperating with said cutout in said body and said apertures in said stamping to retain a shaft received in said bore.

7. The pinch bolt yoke defined in claim 6 wherein said apertures in said stamping are aligned with said cutout and said means for retaining said shaft in said block includes a fastener received in said apertures and said cutout.

8. The pinch bolt yoke defined in claim 5 further including means to prevent movement of said block in said stamping.

9. The pinch bolt yoke defined in claim 8 wherein said arms include inwardly protruding means and said block includes recess means aligned with said protruding means to provide a stop.

10. The pinch bolt yoke defined in claim 5 wherein said body further has a slot formed in said upper surface extending from said cutout to said rear surface.

11. A block for a pinch bolt yoke comprising:
a generally rectangular body including front and rear surfaces, upper and lower surfaces, and first and second side surfaces, said body having a splined bore formed therethrough which extends from said front surface to said rear surface along an axis, said body further having a cutout formed in said upper surface which extends generally perpendicular to said axis and which intersects said bore, said body further having a slot formed in said upper surface extending from said cutout to said rear surface.

12. The block for a pinch bolt yoke defined in claim 11 further including a recess formed in one of said surfaces.

13. The block for a pinch bolt yoke defined in claim 11 further including a groove formed in said lower surface extending from said front surface to said rear surface.

14. The block for a pinch bolt yoke defined in claim 11 wherein said cutout extends from said first side surface to said second side surface.

15. A pinch bolt yoke comprising:
a generally rectangular body including front and rear surfaces, upper and lower surfaces, and first and second side surfaces, said body having a bore formed therethrough which extends from said front surface to said rear surface along an axis, said body further having a cutout formed in said upper surface which extends generally perpendicular to said axis and which intersects said bore, said body further having a slot formed in said upper surface extending from said cutout to said rear surface; and
a stamping including a pair of arms having respective apertures formed therethrough, portions of said stamping extending about said first and second side surfaces of said body.

16. The pinch bolt yoke defined in claim 15 further including means cooperating with said cutout in said body and said apertures in said stamping to retain a shaft received in said bore.

17. The pinch bolt yoke defined in claim 16 wherein said apertures in said stamping are aligned with said cutout and said means for retaining said shaft in said block includes a fastener received in said apertures and said cutout.

18. The pinch bolt yoke defined in claim 15 further including means to prevent movement of said block in said stamping.

19. The pinch bolt yoke defined in claim 18 wherein said arms include inwardly protruding means and said block includes recess means aligned with said protruding means to provide a stop.

20. The pinch bolt yoke defined in claim 15 wherein said cutout extends from said first side to said second side.

21. A pinch bolt yoke comprising:
a generally rectangular body including front and rear surfaces, upper and lower surfaces, and first and second side surfaces, said body having a bore formed therethrough which extends from said front surface to said rear surface along an axis, said body further having a cutout formed in said upper surface which extends generally perpendicular to said axis and which intersects said bore, said body further having a first recess formed therein; and
a stamping including a pair of arms having respective apertures formed therethrough, portions of said stamping extending about said first and second side surfaces of said body, said stamping further including a protrusion which is received within said first recess of said body.

22. The pinch bolt yoke defined in claim 21 wherein said first recess is formed at the intersection of said rear surface with one of said first or said second side surfaces.

23. The pinch bolt yoke defined in claim 22 wherein said first recess extends between said upper and said lower surfaces.

24. The pinch bolt yoke defined in claim 21 wherein said body further includes a second recess formed in one of said first or said second side surfaces and said stamping further includes a second protrusion which is received within said second recess of said body.

* * * * *